US011645302B2

(12) United States Patent
Darden et al.

(10) Patent No.: US 11,645,302 B2
(45) Date of Patent: May 9, 2023

(54) METHODS AND SYSTEMS PROVIDING SYNCHRONIZATION OF DATA IN A DISTRIBUTED SYSTEM USING MICROSERVICE ARCHITECTURE IN SERVERS, STORE CONTROLLERS, TERMINALS AND RELATED ARTICLES OF MANUFACTURE

(71) Applicant: Toshiba Global Commerce Solutions Holdings Corporation, Tokyo (JP)

(72) Inventors: Zachary McCain Darden, New Hill, NC (US); Jonathan Waite, Cary, NC (US); Andrew Wesley Norris, Durham, NC (US); Valentin Mourzenok, Chapel Hill, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 17/025,172

(22) Filed: Sep. 18, 2020

(65) Prior Publication Data

US 2022/0092077 A1 Mar. 24, 2022

(51) Int. Cl.
*G06F 16/27* (2019.01)
*H04L 67/1095* (2022.01)
*G06Q 10/10* (2012.01)

(52) U.S. Cl.
CPC ............ *G06F 16/27* (2019.01); *G06Q 10/10* (2013.01); *H04L 67/1095* (2013.01)

(58) Field of Classification Search
CPC ...... G06F 16/27; H04L 67/1095; G06Q 10/10
See application file for complete search history.

(56) References Cited

U.S. PATENT DOCUMENTS 9,672,480 B2   6/2017   Goh et al.
10,191,911 B2  1/2019   Yuzhakov
(Continued)

FOREIGN PATENT DOCUMENTS

JP         S64611 A      1/1989

OTHER PUBLICATIONS

Syncing Subscriptions and Plans, Plesk Onyx,https://docs.plesk.com/en-US/onyx/reseller-guide/understanding-service-plans-and-subscriptions/syncing-subscriptions-and-plans.64611; Sep. 17, 2020; pp. 1-3.

(Continued)

*Primary Examiner* — Emmanuel L Moise
*Assistant Examiner* — Xiang Yu
(74) *Attorney, Agent, or Firm* — Stanek Lemon Crouse & Meeks, PA

(57) ABSTRACT

A method of synchronizing data across an enterprise system including enterprise servers on an enterprise level and including store locations at a store level including edge devices operatively coupled to the enterprise servers can be provided by providing a changeplan that specifies updated data for microservice data operating within the enterprise system on an endpoint that utilizes the microservice in a microservice architecture to perform operations at a store location, executing the changeplan to initiate an export from an enterprise server that operates the microservice at the enterprise level to create an updated state for the microservice data on the endpoint, replicating the updated state for the microservice data at the enterprise server to provide an export updated state for the microservice data on the endpoint, storing the export updated state for the microservice data in an export table at the enterprise level, transmitting a message on a durable message bus from the enterprise level to the store level, initiating an import process at a store (Continued)

server responsive to receiving the message on the durable message bus and retrieving the export updated state for the microservice data from the export table.

11 Claims, 6 Drawing Sheets

(56) References Cited

U.S. PATENT DOCUMENTS

| | | |
|---|---|---|
| 10,530,743 B2 | 1/2020 | Feinleib et al. |
| 2009/0300072 A1 | 12/2009 | Goh et al. |
| 2013/0339490 A1* | 12/2013 | Tejomurtula ........ H04L 67/1095 709/219 |
| 2019/0294604 A1* | 9/2019 | Martinez ................. G06F 16/27 |

OTHER PUBLICATIONS

Independently scalable, next-generation architecture; Microservices Architecture Using Java, Broadleaf Commerce, https://www.broadleafcommerce.com/miroservice-architecture, Sep. 17, 2020; pp. 1-5.

Build; Plesk for Content Managers, https://www.plesk.com/content-managers/, Sep. 17, 2020; pp. 1-6.

Bring the Power of the Ignition Gateway Network to the Edge, IgnitionEdge EAM, Product Data Sheet, www.inductiveautomation.com, Rev. Jun. 17, 2020; pp. 1-2.

Start-Edge Synchronization (ExchangePowerShell), Microsoft Docs, https://docs.microsoft.com/en-us/powershell/module/exchange/start-edgesynhronization?view=exchange-ps; Sep. 17, 2020; pp. 1-6.

* cited by examiner

Changeplan (CP) Data registry 300

| CPFALL2020.0 | ID/VER | STATUS | EXECUTION/RESULTS |
|---|---|---|---|
| MS: Pricelist | | | |
| MS: Catalog | | | |
| MS: Config | | | |
| MS: Other | | | |
| CPFAL2020.1 | ID/VER | | |
| CPFALL2020+ | ID/VER | | |

CP Registration Service 400

METHODS AND SYSTEMS PROVIDING SYNCHRONIZATION OF DATA IN A DISTRIBUTED SYSTEM USING MICROSERVICE ARCHITECTURE IN SERVERS, STORE CONTROLLERS, TERMINALS AND RELATED ARTICLES OF MANUFACTURE

FIELD

The present invention relates to the field of information processing in general, and more particularly, to data synchronization in distributed systems.

BACKGROUND

It is known to use a central repository of information indicating data that is to be changed on a server using message queues.

SUMMARY

Embodiments according to the present invention can include methods and systems providing synchronization of data in a distributed system using a microservices architecture in servers, controllers, and terminals and related articles of manufacture. Pursuant to these embodiments, a method of synchronizing data across an enterprise system including enterprise servers on an enterprise level and including store locations at a store level including edge devices operatively coupled to the enterprise servers can be provided by providing a changeplan that specifies updated data for microservice data operating within the enterprise system on an endpoint that utilizes the microservice in a microservice architecture to perform operations at a store location, executing the changeplan to initiate an export from an enterprise server that operates the microservice at the enterprise level to create an updated state for the microservice data on the endpoint, replicating the updated state for the microservice data at the enterprise server to provide an export updated state for the microservice data on the endpoint, storing the export updated state for the microservice data in an export table at the enterprise level, transmitting a message on a durable message bus from the enterprise level to the store level, initiating an import process at a store server responsive to receiving the message on the durable message bus and retrieving the export updated state for the microservice data from the export table.

DETAILED DESCRIPTION OF EMBODIMENTS ACCORDING TO THE INVENTION

Figures 1, 3:
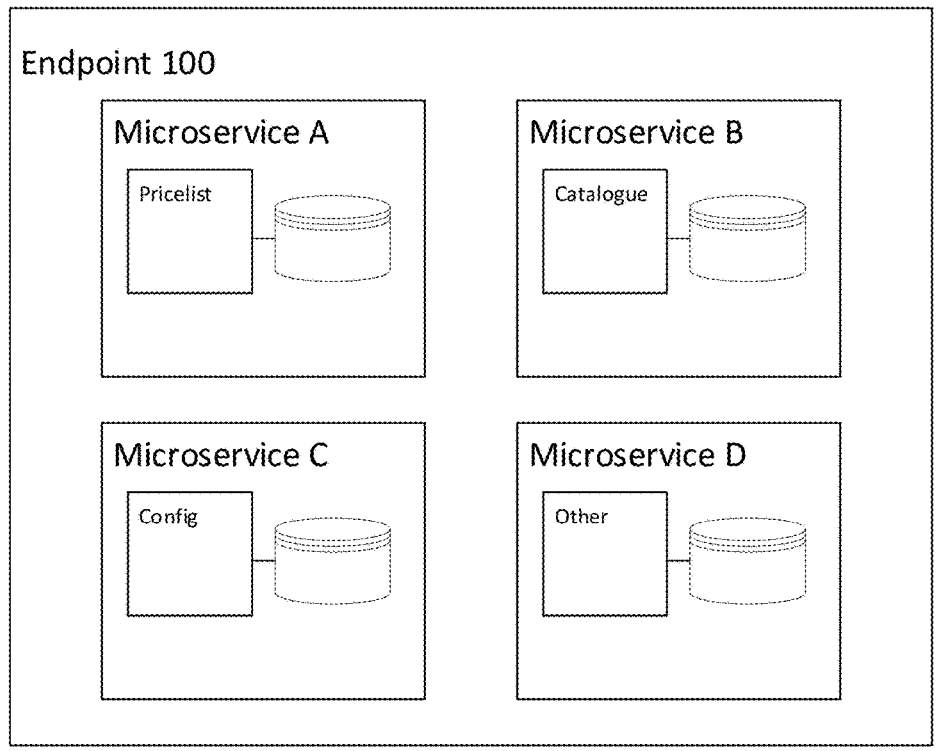
FIG. 1 is a schematic illustration of a microservices architecture utilized in the system shown in FIG. 2 in some embodiments according to the invention.
FIG. 3 is a schematic illustration of a changeplan data registry in some embodiments according to the invention.

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As appreciated by the present inventors, there can be significant challenges to maintaining data synchronization in a distributed system, such as in a retail environment, where data is replicated across an enterprise that includes cloud based servers and edge devices, such as in-store servers and terminals, that may not be on-line continuously. For example, some retail environments can include a cloud-based enterprise system that is operatively coupled to a network of retail locations each of which may have store servers, store controllers, and terminals that utilize data, such as prices, and listing of items for sale, that must be synchronized across the system. Moreover, the data utilized throughout the system may need to be dynamically changed to support, for example, updates (additions/deletions) to the catalogue of items offered for sale, changes to the prices of the items offered for sale, new software versions and configurations for systems (such as endpoint terminals), and the like. Accordingly, as used herein the term "data" as part of an update can refer to all of the types of data referred to above, all of which must be synchronized across the system as part of an update. Other types of data may also be used.

As further appreciated by the present inventors, it could be useful to retailers to update their microservices data in stages or via a limited "roll-out." For example, retailers may elect to update the microservices data only at specific retail locations, or on specific systems or configurations, to reduce the likelihood that those changes would have significant impact on operations. Further, retailers may also elect to maintain the previous state of the microservices data (for example, at the enterprise level) so that the changes can be rolled-back if a problem arises during the limited roll-out so that operations can continue with minimal interruption.

Still further, it could be useful to retailers to maintain different configurations (including different software configurations) for systems or terminals within the enterprise. For example, a retailer may elect to operate first and second system configurations, as specified by first and second respective changeplans, within a retail location to evaluate which of those configurations provides the best solution before deploying the final configuration across the enterprise.

Accordingly, in some embodiments according to the invention, a changeplan can be implemented that defines the microservices data that is to be updated for specified microservices that are provided within the enterprise relative to the current version of the microservices data that is executed at a retail location, on a server, on a store controller, or on a terminal. A changeplan can specify the microservices data that is to be updated for a registered microservice as well as the metadata that describes the status of the changeplan itself and the result of executing the changeplan to have the update take effect on the microservice. Other metadata can also be included in or specified by the changeplan.

FIG. 1 is a schematic illustration of a microservices architecture 100 in some embodiments according to the invention. According to FIG. 1, the microservice architecture 100 provides a collection of small services (referred to herein as either microservices or services) that are loosely coupled together to provide the same overall functionality to, for example, endpoints deployed at a particular retail location. As shown in FIG. 1, each microservice has access to respective data (i.e., microservices data) that the microservice needs in order to provide the required functionality. For example, the Pricelist microservice has access to pricing data for items purchased by shoppers. However, the Pricelist microservice does not require access to the catalog data.

The microservice architecture 100 approach stands in contrast to a monolithic type architecture wherein a single application is configured to provide all the services to the endpoint. In contrast, each microservice can be implemented as an independent component, making it possible to update each of the microservices without effecting the others. For example, if a heavy load is placed on a particular microservice, a monolithic approach may require that the entire application to be scaled up, which may affect other functions. In contrast, the microservice architecture 100 is configured to scaleup the more heavily loaded microservice while also maintaining the other microservices as-is or to be scaled differently. Accordingly, the microservice architecture 100 can be used to change or expand services at the individual microservice level without effecting the other microservices provided to an endpoint in some embodiments according to the invention.

It will be further understood that the microservices described herein can operate at the enterprise level and at the store level and can be configured to process requests from (and issue responses to) the changeplan services described herein as well as process requests from (and issue responses to) other microservices. For example, in some embodiments according to the invention, any microservice at the enterprise level can be configured to perform an export process to provide the updated data for a microservice as a new state in an export table for that microservice. Similarly, in some embodiments according to the invention, any microservice at the store level can be configured to perform an import process to retrieve the new state (including updated data for a particular microservice) to provide the new state in a database available to the endpoint for which the new state was imported.

Figure 2:
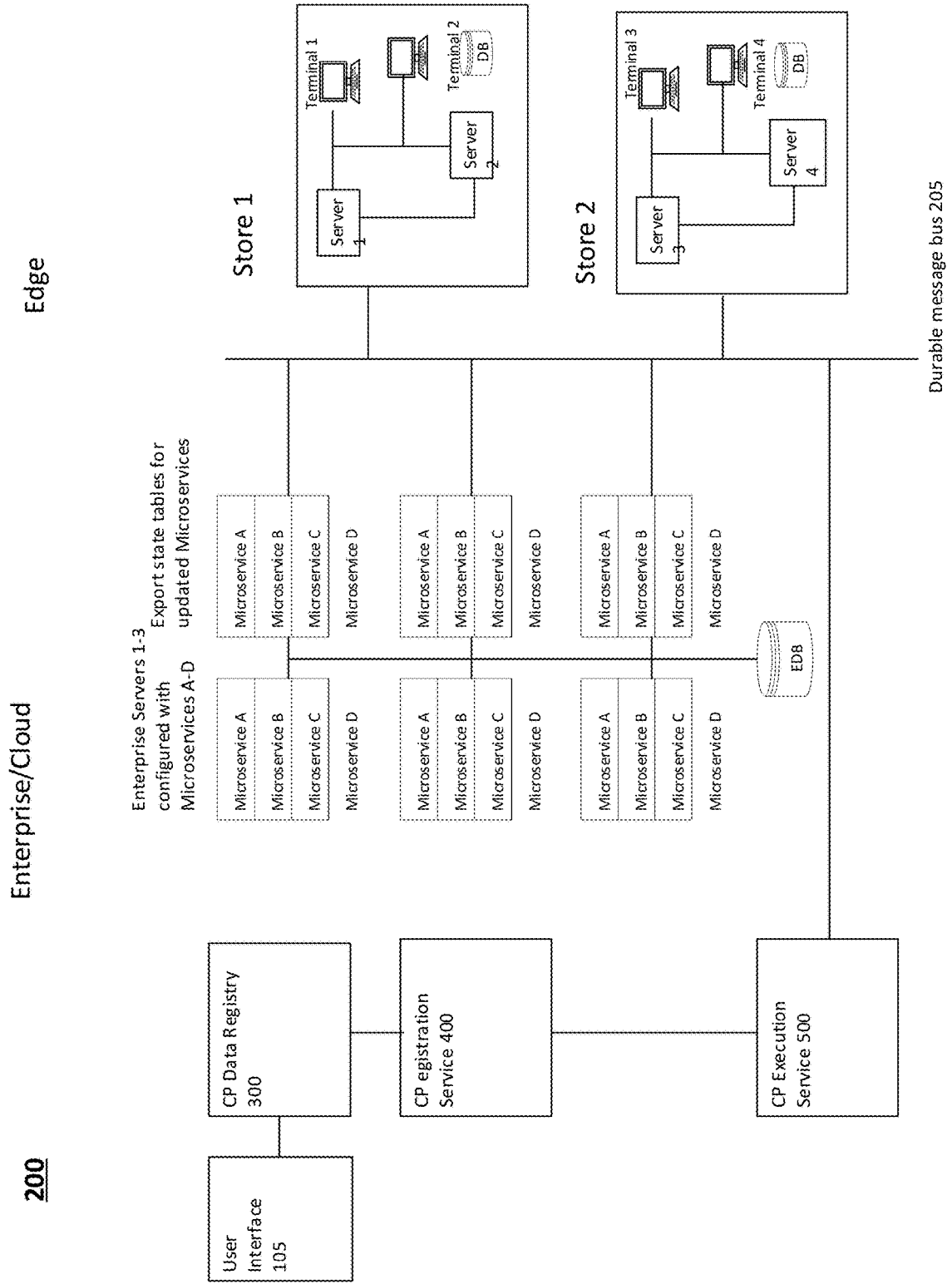
FIG. 2 is a block diagram of a distributed system configured to use changeplans to perform microservices data updates to system endpoints that utilize the microservices architecture of FIG. 1 to provide synchronization of updated data across an enterprise in some embodiments according to the invention.

FIG. 2 is a block diagram of a distributed system 200 configured to use changeplans CP to perform microservice data updates for endpoints that utilize the microservices architecture 100 of FIG. 1 to synchronize updated data across the entire enterprise (in the cloud-based servers and in the edge devices located outside the cloud in the stores) in some embodiments according to the invention. According to FIG. 2, the system 200 provides data updates for microservices that are deployed across the system 200, including at the enterprise level and at the store level, across a plurality of stores. In operation, when a changeplan CP including references to one or more microservices is invoked, the changeplan services at the enterprise level generate and control the export of the updated microservices data to all microservice endpoints that are registered with the invoked changeplan. For example, if a changeplan CPFALL2020 involves an update of the pricelist microservice data and the catalog microservice data, the updated versions of these microservices data are exported to all endpoints that are registered within CPFALL2020. It will be understood that the servers, store controllers, and terminals that operate at the stores in FIG. 2 can be considered edge devices.

The completion of the export of the microservices data at the enterprise is communicated to the store servers by transmitting a message over a durable message bus 205 that couples the enterprise level to the stores. It will be understood that the messages will persist on the durable message bus 205 to ensure that the servers A-D at the stores 1-2 receive the messages despite being off-line when the messages are transmitted. When the store server A-D receive the export complete message, one of the store servers A-D initiates an import process which results in the updated microservices data being retrieved from the enterprise and loaded into a database that is accessible to terminals 1-4 at the stores 1-2. The microservices can be used by terminals 1-4 to, for example, scan items and determine the total costs for a shopper.

As shown in FIG. 2, the store servers A-D are operatively coupled to the terminals 1-4 and can provide resources to the terminals. For example, in some embodiments, the store servers A-D can maintain their own copies of the microservices (or different versions of the microservices) that support the terminals 1-4. It will be understood that although only two stores 1-2 are shown, more stores can be included in the system 200 at the store level.

As further shown in FIG. 2, the enterprise includes enterprise servers 1-3, each of which can provide instances of microservices A-D, that are used by the system to support retail operations across the enterprise, the store servers A-D, and the terminals 1-4. The instances of the microservices A-D at the enterprise level can correspond to the microservices A-D used at the store servers A-D and terminals 1-4. The state of each microservice A-D at the enterprise is maintained at the enterprise level in a database EDB, which represents the current version of that microservice that is used to carry out operations across the system 200. In some embodiments according to the invention, the microservices A-D can include a catalog of items offered for sale, the prices for those items, configurations, and other services. The state of the microservices at the enterprise and store level are maintained in synchronization to ensure that retail operations are carried out correctly. For example, the data for the pricelist microservice at the enterprise level is synchronized with the microservices at the store level so that sales of the items scan be managed by the enterprise and performed correctly at the store. Moreover, the synchronization of the microservices is maintained across the system when changes are made to the microservices data, such as changes to the pricelist data, for example.

Still referring to FIG. 2, the enterprise servers 1-3 are operatively coupled to a plurality of export state tables that are configured to store updated microservice states for microservices A-D that are to be updated at the store level. In particular, the enterprise servers 1-3 that operate the microservices A-D are configured to update the state of each of the microservices A-D operated by the server and then to replicate each updated state for storage in the export state tables. In some embodiments, the updated state of each microservice A-D maintained by the enterprise servers 1-3 represents a full state that includes the updated data as well as other portions of the full state that were not updated.

In some embodiments the updated state of each microservice A-D maintained by the enterprise servers 1-3 represents a partial state that includes only the updated data, which is sometimes referred to herein as a delta update. The delta update will include a reference refer In still further embodiments, both a full state update and a delta state update are stored in the export state tables. In further embodiments, the enterprise servers 1-3 can be requested to dynamically generate a delta state update, when for example, a store server determines that the size of the delta state update is small enough compared to the full state update. Moreover, the enterprise server that maintains the delta update of the microservices data can establish the delta update as a persistent update so that if a second store server requests a delta update, the enterprise server can provide the same persistent delta update if the microservice state of the second store server is identical to that of the previous store server before the delta update was applied. If, however, the microservice state of the second store server is not identical, then the enterprise server can generate a new delta update for the second store server. As appreciated by the present inventors, a delta update may reduce the bandwidth requirement for performing the import to the microservices at the edge as described herein.

As further shown in FIG. 2, a user interface 105 is configured to allow a user to create the changeplans CP that describe the microservices data that is to be updated across the system 200 (at the enterprise level and at the store level). In some embodiments multiple changeplans can be created and be made to run simultaneously so that different terminals and/or servers at the stores run different microservice states. Accordingly, multiple changeplan can enable retailers to maintain different configurations (including different software configurations and or different microservices data) for systems or terminals within the enterprise. For example, a retailer may elect to operate first and second otherwise identical endpoints with different microservices data, as specified by first and second respective changeplans, within a retail location to evaluate which of those configurations provides the best solution before deploying the final configuration across the enterprise.

The user interface 105 is coupled to a changeplan data registry 300, which is shown in more detail in FIG. 3, in some embodiments according to the invention. According to FIGS. 2 and 3, the changeplan data registry 300 can include a representation of each created changeplan CP that defines the data that is to be updated for each microservice as part of the changeplan CP. For example, the changeplan CPFall2020.0 can include data (or references to data) to be updated for each registered microservice endpoint when the changeplan CPFall2020.0 is invoked. In some embodiments according to the invention, the changeplan CP can include an Identifier ID and a version number VER that defines the current production version of the data and configuration that is approved for use across the system. In particular, the version number VER for the changeplan CP refers to the current production version of the data and configuration (which is also maintained in EDB) and defines the updated data relative to that VER.

In some embodiments according to the invention, the changeplan CP can include a current status of the changeplan CP, including 1) Draft, where the changeplan CP is currently under development 2) Pending, where the changeplan CP has been finalized and is ready for execution and 3) Executing, where the changeplan CP is executing whereupon the changeplan CP to export the updated microservices to the export state tables at the enterprise. Still further, in some embodiments according to the invention, the changeplan data registry 300 can include an indication of the result that occurs when the changeplan CP is executed against the microservices, such as COMPLETE or ERROR.

In some embodiments according to the present invention, the CP data registry 300 can also include multiple changeplans that are configured to run simultaneously with each other. For example, as shown in FIG. 3, a changeplan CPFALL2020.1 can be configured to run concurrently with CPFALL2020.0 where the changeplans include different microservices data relative to the current production version. In such embodiments, each changeplan may cause updates to different endpoints across the system.

In still further embodiments according to the present invention, the CP data registry 300 can also include an incremental changeplans CP that define the microservices data updates that are to be made relative to previous changeplan CP. For example, if the changeplan CPFALL2020.0 is defined relative to the current production version of the microservices data, then an incremental changeplan CPFALL2020+ can be defined to update the registered microservices relative to the updates specified by CPFALL2020. In such embodiments it will be understood that any incremental changeplan CP that defines an update relative to a first changeplan CP will be executed after the first changeplan CP. Moreover, it will be understood that any number of incremental changeplans CO can be supported.

Figure 4:
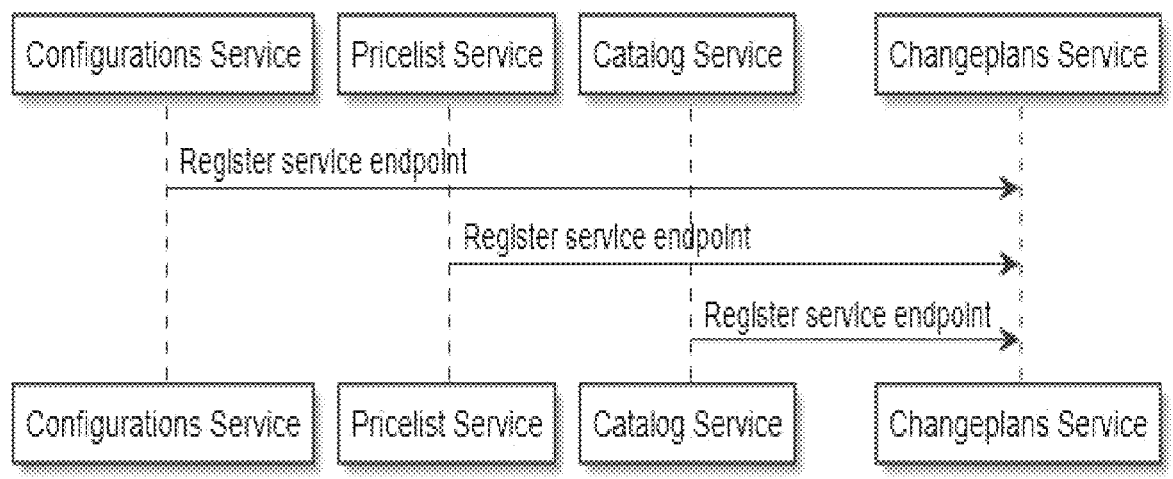
FIG. 4 is a schematic illustration of operations of a changeplan registration service configured to provide registration of microservice endpoints that support changeplan execution for data updates to the microservice at the endpoint in some embodiments according to the invention.

As further shown in FIG. 2, the CP data registry 300 is operatively couple to a CP registration service 400 that is illustrated in greater detail in FIG. 4 in some embodiments according to the invention. The CP registration service 400 is configured such that any microservice that supports the execution of changeplans CP registers its respective endpoint with the changeplan registration service 400. For example, as shown in FIG. 4, the Configuration, Pricelist, and Catalog microservices register their respective endpoints with the changeplan registration service 400. It will be understood that each operating microservice within the system can register its respective endpoint (e.g., a terminal, a store controller, or store server) with the changeplan registration service 400. Accordingly, the changeplan registration service 400 may include a registration entry for each endpoint that operates a particular microservice and is to be updated when the changeplan is executed. For example, if a particular retail location includes 25 terminal endpoints that all operate using the Pricelist microservice, the changeplan registration service 400 can be updated to include a reference to each of the 25 endpoints for the Pricelist microservice. When the changeplan CP executes, an export of the updated Pricelist microservice state can be provided to each of the 25 terminals endpoints that registered with the changeplan registration service 400. It will be further understood that, in some embodiments according to the invention, the changeplan registration service 400 can operate at, and maintain the changeplan microservice registration data at the enterprise level.

Figure 5:
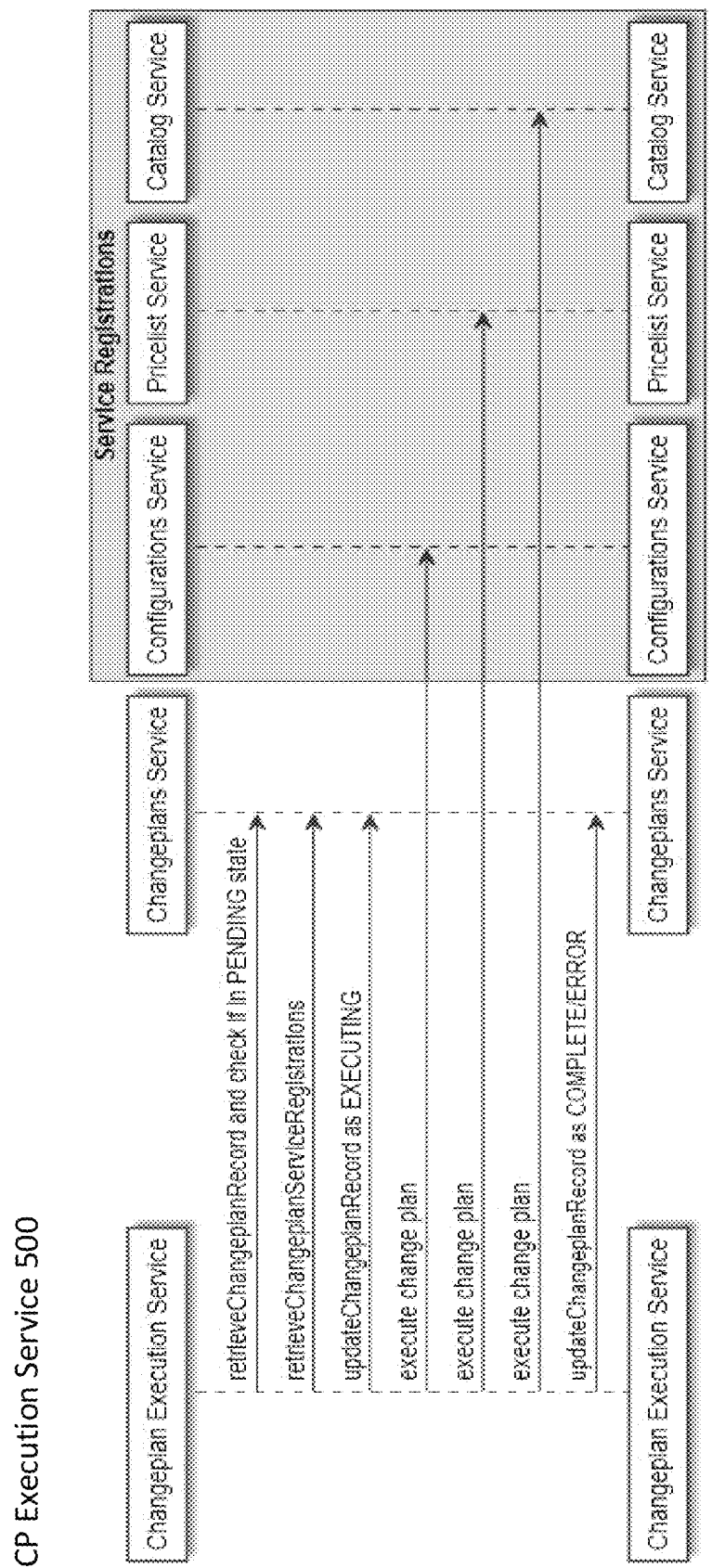
FIG. 5 is a schematic illustration of operations of a changeplan execution service configured to retrieve metadata for a specified changeplan including metadata associated with the microservice endpoints that registered with that changeplan and configured to execute the specified changeplan to provide the updated data included in the specified changeplan to the registered microservice endpoints in some embodiments according to the invention.

FIG. 5 is a schematic illustration of operations of a changeplan execution service 500 configured to retrieve the registered microservice endpoints from the changeplan registration service 400 and run a specified changeplan CP on those registered microservice endpoints. According to FIG. 5, the changeplan execution service 500 queries the changeplan registration service 310 to retrieve the changeplan CP and determine if the status of the changeplan is "pending." It will be understood that the changeplan execution service 500 will only execute the specified changeplan CP if the status of the changeplan CP (in the CP data registry 300) is indicated as "pending,' otherwise the specified changeplan CP will not be executed. If the status is "pending" the changeplan execution service 500 then determines the endpoints for the registered microservices included in the specified changeplan CP and changes the status of the changeplan CP from Pending to "Executing," which causes a message to be transmitted on the durable bus 205 indicating that an export updated state process is to begin. It will be understood that the "state" incudes the updated microservices data (as specified by the changeplan CP) and all other state information that the endpoint requires.

Next the changeplan execution service 500 executes the specified changeplan CP on the each of the registered microservices endpoints. For example, if the specified changeplan CP includes updates for the pricelist microservice and the catalog microservice, an export updated state process is started for the pricelist microservice and the catalog microservice responsive to the message on the durable message bus. The export updated state process will incorporate the updated data specified by the changeplan for the pricelist microservice and the catalog microservice. It will be understood that only one enterprise server needs to perform the export updated state process for each of the microservices. For example, in some embodiments, a first enterprise server performs the export updated state process for the pricelist microservice whereas a second enterprise server can perform the export updated state process for the catalog microservice. It will also be understood that, in some embodiments according to the invention, as part of the export updated state process for each microservice, the enterprise server can copy the export updated state for each microservice to the respective export state table from which a store server may retrieve the export updated state subsequently.

Once the changeplan CP execution is finished, the changeplan execution service 500 determines the status reported back by each of the registered microservices at the completion (Complete/Error) and updates the execution result in the changeplan data registry 201. If the status reported back by each of the registered microservices is "Complete" then each of the registered microservices in the executed changeplan CP reported successful execution of the changeplan CP and the status of the executed changeplan CP is changed to "Complete." It will be further understood that, in some embodiments according to the invention, the changeplan execution service 500 can operate at the enterprise level so that the operations described above are executed on the microservices at the enterprise level, such as in a cloud based computing environment. At the completion of the changeplan execution, the enterprise has been provided with the data update that are to be applied across all microservices (as specified by the changeplan) that are present at the edge.

Figure 6:
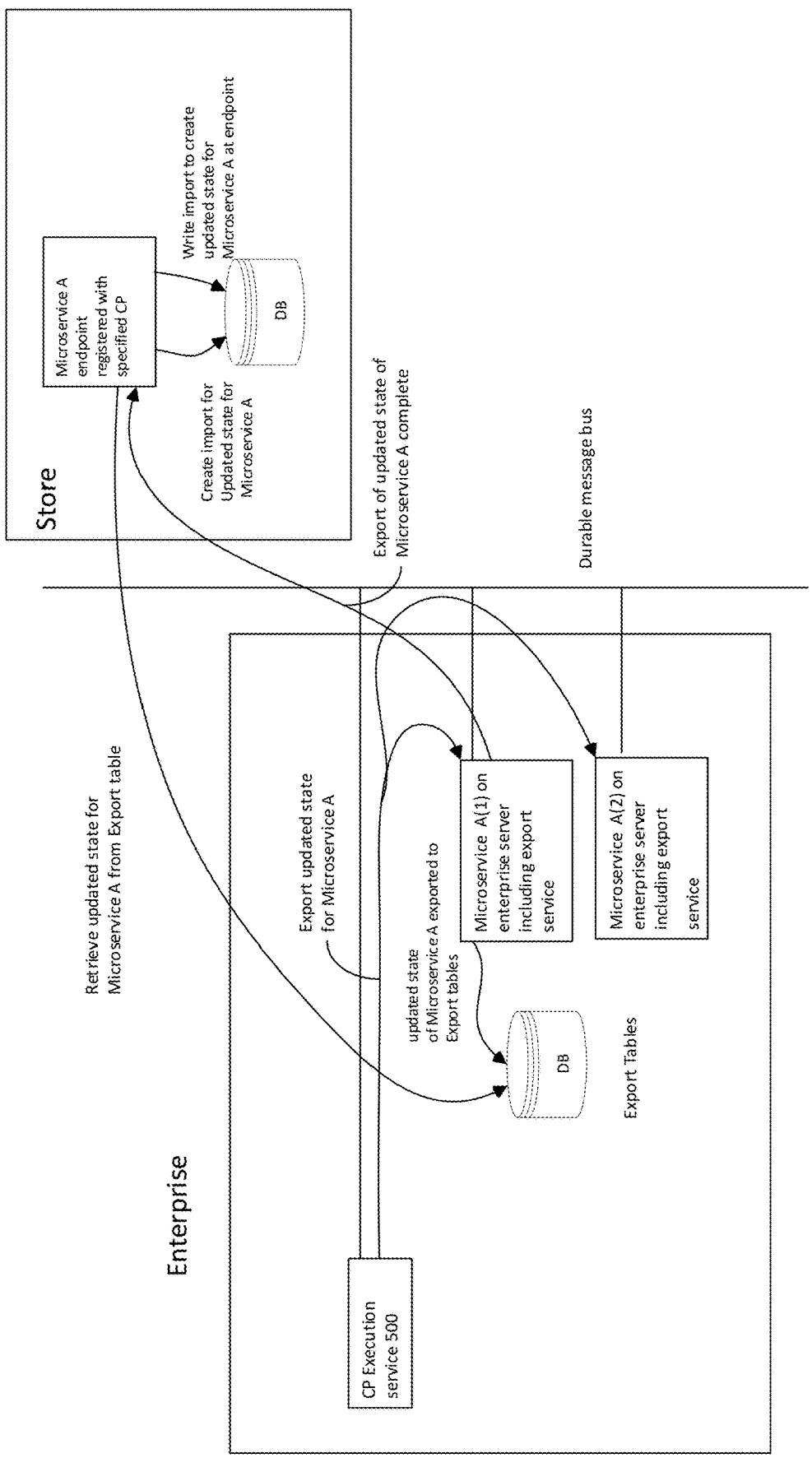
FIG. 6 is an exemplary illustration of an export/import process configured to generate an updated microservices state for a microservice A in an export table at the enterprise level, which is imported by a store server or controller for a microservice A endpoint at the store in some embodiments according to the invention.

FIG. 6 is an exemplary illustration of an export/import process configured to generate an updated state for a microservice A in an export state table at the enterprise level, which is imported by a store server or controller for a microservice A endpoint at the store in some embodiments according to the invention. Referring to FIG. 6, when the execution of the specified changeplan CP is complete, a changeplan complete signal is transmitted onto the durable message bus 205 that is coupled to the enterprise level instances of the microservices that operate at the retail level.

As shown in FIG. 6, a first instance of the microservice A (designated as microservice A(1)) detects the changeplan complete signal first and begins the export updated state process to generate the table including the complete update state and/or the delta update state as described herein. When a second instance of the microservice instance A (designated as microservice A(2)) receives the changeplan complete signal (after microservice instance A(1)), microservice A2 does not begin a second export update process as only a single export process is needed to generate the complete and/or delta update state for the microservices operating at the retail level.

At the completion of the export update process, the enterprise level database EDB holds the tables that represent the complete (and/or delta) updated state for microservice A operating at any endpoint at the store level that was registered with the executed changeplan CP. It will be understood that in some embodiments, if the executed changeplan CP did not include particular endpoints that operate microservice A, those microservices will not be updated with the updated state for microservice A. Still further, in some embodiments other microservices may also be registered with the executed changeplan CP and would therefore also be subject to a corresponding export update process to provide an updated state for that microservice. Once the export process is complete (i.e. all updated microservice states are successfully replicated in the export tables), the enterprise server that performed the export update process transmits an export complete signal onto the durable bus 205 where it can be received by a store server or store controller.

As further shown in FIG. 6, microservice A receives the export complete signal and begins an import process whereby the export tables that store the complete and/or delta state in the enterprise database EDB are imported by the microservice A. The microservice A then replicates the imported tables in a database DB that is operatively coupled to the endpoint associated with microservice A at the store. It will be understood that only one microservice at the store level is needed to perform the import process. If a second microservice also detects the export complete signal, the second microservice will not begin an import process if any other microservice has already performed (or is currently performing) the import process. Accordingly, the microservice A can perform the import process to provide the complete or delta update in the retail level database, which can then be accessed by any microservice operating at the retail level.

Figure 7:
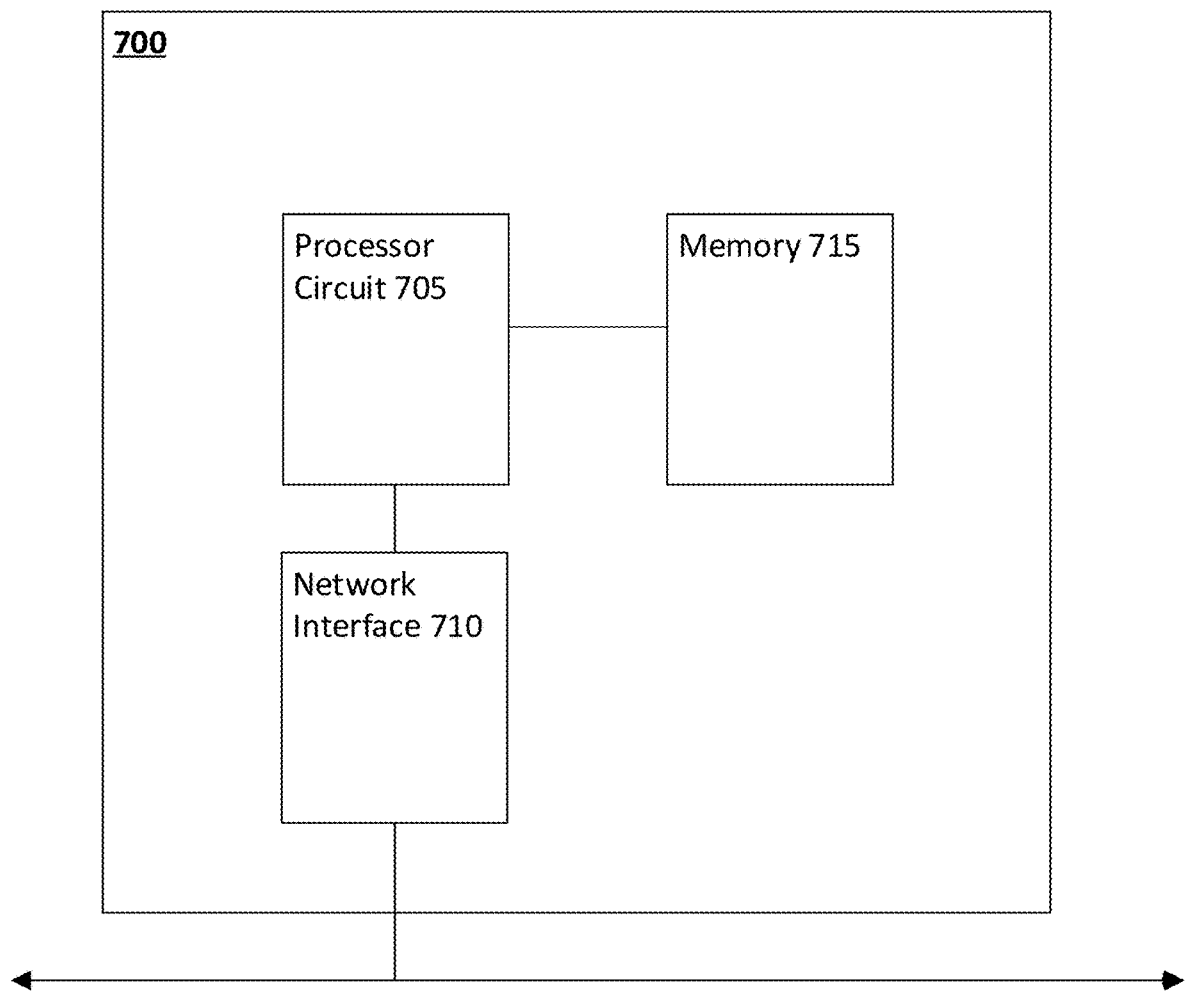
FIG. 7 is a block diagram of a server or other resource configured to support microservices at the enterprise or store level in some embodiments according to the invention.

FIG. 7 is a block diagram of a server 700 configured to execute microservices and the other operations at the enterprise or store level as described herein and as illustrated in FIGS. 1-6 in some embodiments according to the invention. According to FIG. 7, the server 700 includes a processor circuit 705 that the coordinates overall operations of the server 700. As further shown in FIG. 7 the processor circuit 705 is coupled to a memory 715. The memory 715 can store data, such as the data associated with the CP Data Registry 300, the CP Registration Service 400, and the CP Execution Service 500, the updated for the microservices, the updated state for the microservices to be imported, and instructions for the processor to carry out the operations described herein. As further shown in FIG. 7, the processor circuit 705 is coupled to a network interface 710 that is coupled (directly or indirectly) to a bus 720, such as the durable message bus 205 that can be used to communicate with other servers, controllers and endpoints across the system 200. In some embodiments according to the invention, the server can be a store controller marketed by Toshiba Global Commerce Solutions, Inc. of Durham, N.C. In some embodiments according to the invention, the server can be a point of sale terminal marketed by Toshiba Global Commerce Solutions, Inc. of Durham, The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flow diagram illustrations and/or block diagrams of methods, systems and computer program products according to embodiments. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flow diagram and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flow diagram and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flow diagram and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

While the foregoing is directed to aspects of the present disclosure, other and further embodiments of the disclosure may be devised without departing from the basic scope thereof, and the scope thereof is determined by the claims that follow.

What is claimed:

1. A method of synchronizing data across an enterprise system, the method comprising:
    providing a changeplan to an enterprise server associated with an enterprise system, the enterprise system comprising an enterprise level and a group of endpoints at a store level, wherein the changeplan specifies updated data for a microservice operating within the enterprise system on each endpoint among the group of endpoints at the store level, wherein each endpoint utilizes the microservice to perform operations within the enterprise system at the store level;
    executing the changeplan to initiate an export operation from the enterprise server;
    responsive to initiating the export operation from the enterprise server, generating an updated state for the microservice;
    replicating the updated state for the microservice at the enterprise server;
    providing an export updated state based on the replicated updated state for the microservice;
    storing the export updated state in an export table at the enterprise level;
    transmitting a message on a durable message bus from the enterprise level to the store level indicating that the export operation is complete, wherein the message is made persistently available on the durable message bus such that an offline endpoint can receive the message when the offline endpoint comes online;
    initiating an import process at the store level responsive to receiving the message on the durable message bus; and
    retrieving the export updated state for the microservice from the export table.

2. The method of claim 1 wherein providing the changeplan further comprises:
    providing a first changeplan that specifies first updated data for the microservice operating within the enterprise system on a first endpoint that utilizes the microservice to perform operations; and
    providing a second changeplan that specifies second updated data for the microservice operating within the enterprise system on a second endpoint that utilizes the microservice to perform operations.

3. The method of claim 2 wherein the first changeplan defines the first updated data for the microservice relative to a production version of the microservice and the second changeplan defines the second updated data for the microservice relative to the production version.

4. The method of claim 3 wherein the first updated data is different than the second updated data.

5. The method of claim 2 wherein the first changeplan defines the first updated data for the microservice relative to a production version of the microservice and the second changeplan defines the second updated data for the microservice relative to the first updated data.

6. The method of claim 5 wherein executing the changeplan further comprises:
    executing the first changeplan to initiate an export from the enterprise server that operates the microservice at the enterprise level to create a first updated state for the microservice on the first endpoint relative to a production version of the microservice; and then
    executing the second changeplan to initiate an export from the enterprise server that operates the microservice at the enterprise level to create a second updated state for the microservice on the second endpoint relative to the first updated data.

7. The method of claim 1 wherein executing the changeplan further comprises:
    executing the changeplan to initiate the export operation from the enterprise server that operates the microservice at the enterprise level to create a delta updated state for the microservice on a first endpoint, wherein the delta updated state comprises less than a full state updated state for the microservice on the first endpoint and includes additions to and deletions from the microservice relative to a production version of the microservice.

8. The method of claim 7 wherein executing the changeplan further comprises:
    executing the changeplan to initiate the export operation from the enterprise server that operates the microservice at the enterprise level to create a full updated state for the microservice on the first endpoint, wherein the full updated state and the delta updated state are maintained in the export table.

9. The method of claim 8 wherein retrieving the export updated state comprises retrieving a full export updated state or a delta export updated state for the microservice from the export table.

10. The method of claim 1 wherein initiating the import process at the store level further comprises:
    receiving a request for the export updated state for the microservice on a first endpoint at the enterprise server; and
    generating a delta updated state for the microservice on the first endpoint responsive to the request if a size of a full updated state is greater than a delta updated state, wherein the delta updated state comprises less than a full state updated state for the microservice on the first endpoint and includes additions to and deletions from the microservice relative to a production version of the microservice.

11. A non-transitory computer-readable medium whose contents, when executed by a computing system, cause the computing system to perform operations for synchronizing data across an enterprise system including enterprise servers on an enterprise level and including store locations at a store level including edge devices operatively coupled to the enterprise servers comprising:

synchronizing data across an enterprise system, wherein the enterprise system comprises an enterprise level and a group of endpoints at a store level including edge devices operatively coupled to an enterprise servers, wherein each endpoint utilizes a microservice to perform operations within the enterprise system at the store level, the method comprising:

providing a changeplan to the enterprise server, wherein the changeplan specifies updated data for the microservice operating within the enterprise system on each endpoint among the group of endpoints at the store level;

executing the changeplan to initiate an export operation from an enterprise server;

responsive to initiating the export operation from the enterprise server, generating an updated state for the microservice;

replicating the updated state for the microservice at the enterprise server;

storing the export updated state in an export table at the enterprise level;

transmitting a message on a durable message bus from the enterprise level to the store level indicating that the export operation is complete, wherein the message is made persistently available on the durable message bus such that an offline endpoint can receive the message when the offline endpoint comes online;

initiating an import process at the store level responsive to receiving the message on the durable message bus; and retrieving the export updated state for the microservice from the export table.

* * * * *

UNITED STATES PATENT AND TRADEMARK OFFICE
CERTIFICATE OF CORRECTION

PATENT NO. : 11,645,302 B2
APPLICATION NO. : 17/025172
DATED : May 9, 2023
INVENTOR(S) : Darden et al.

Page 1 of 1

It is certified that error appears in the above-identified patent and that said Letters Patent is hereby corrected as shown below:

In the Claims

Column 13, Claim 11, Line 4: Please correct "an enterprise servers" to read -- an enterprise server --

Claim 11, Line 20: Please correct "storing the export updated state in an export table" to read -- storing the export updated state for the microservice in an export table --

Signed and Sealed this
Twenty-seventh Day of June, 2023

Katherine Kelly Vidal
*Director of the United States Patent and Trademark Office*